United States Patent [19]

Kremnitz

[11] 4,119,900
[45] Oct. 10, 1978

[54] METHOD AND SYSTEM FOR THE AUTOMATIC ORIENTATION AND CONTROL OF A ROBOT

[75] Inventor: Walter Kremnitz, Eberbach, Neckar, Fed. Rep. of Germany

[73] Assignee: ITO Patent-AG, Zurich, Switzerland

[21] Appl. No.: 696,525

[22] Filed: Jun. 16, 1976

Related U.S. Application Data

[63] Continuation-in-part of Ser. No. 534,080, Dec. 18, 1974, abandoned.

[30] Foreign Application Priority Data

Dec. 21, 1973 [DE] Fed. Rep. of Germany ....... 2364002

[51] Int. Cl.$^2$ .............................................. G05D 1/00
[52] U.S. Cl. .................................. 318/587; 318/580; 180/79.1; 364/424
[58] Field of Search .................... 235/150.2; 180/79.1, 180/98; 318/580, 587, 570, 574

[56] References Cited

U.S. PATENT DOCUMENTS

| 3,570,227 | 3/1971 | Bellinger | 180/98 X |
| 3,612,206 | 10/1971 | Ohntrup | 318/587 X |
| 3,713,505 | 1/1973 | Muller | 180/98 X |
| 3,715,572 | 3/1971 | Bennet | 235/150.2 |
| 3,744,586 | 7/1973 | Leinauer | 180/98 X |
| 3,845,289 | 7/1972 | French | 235/151.2 |

Primary Examiner—Robert K. Schaefer
Assistant Examiner—Eugene S. Indyk
Attorney, Agent, or Firm—W. G. Fasse; W. W. Roberts

[57] ABSTRACT

The present method and system for the automatic orientation and control of a robot in a space or on a surface to be worked by the robot, for example an area to be vacuum-cleaned or a lawn to be mowed, employs a plurality of distance measuring devices, which continuously and repeatedly measure distances from the robot to points or small surface areas defining the surface to be worked. Electro-optical distance measuring devices are effective in a far range. Electro-acoustical distance measuring devices are effective in a close range. Electro and/or mechanical means are effective in a contact range. The distance measuring devices continuously ascertain scalar values which by means of data processing are transformed into digital control signals for the drive means and for the tools carried by the robot, whereby the robot plans its own driving and working strategies as the result of said continuous distance measurements. The drive means include wheels which constitute simultaneously digitally controllable drive motors for the robot. The wheels are tiltable about vertical axes for steering the robot.

39 Claims, 13 Drawing Figures

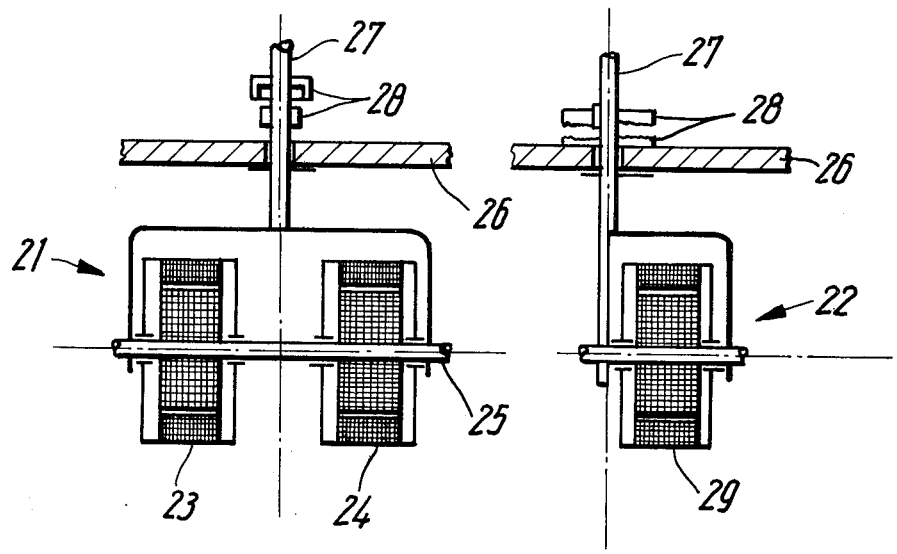
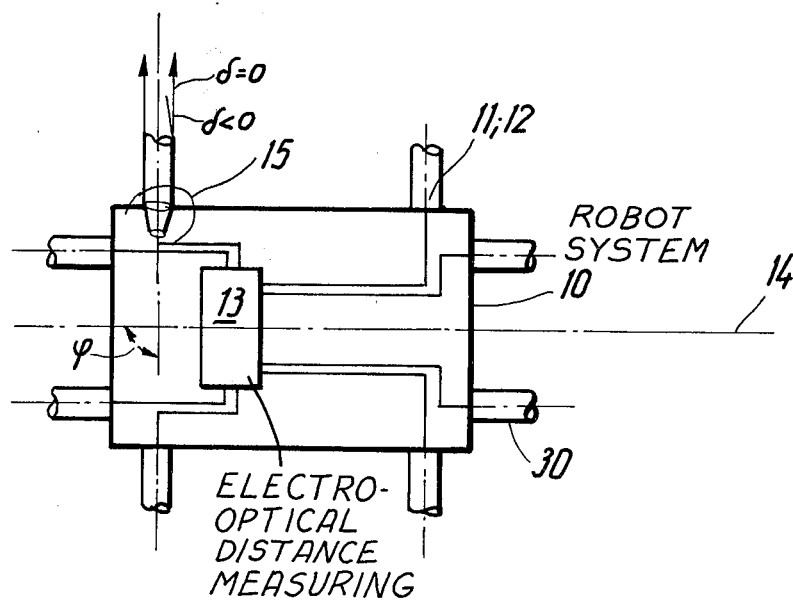

METHOD AND SYSTEM FOR THE AUTOMATIC ORIENTATION AND CONTROL OF A ROBOT

CROSS REFERENCE TO RELATED APPLICATIONS

The present invention is a continuation-in-part application of copending application Ser. No. 534,080 filed Dec. 18, 1974 now abandoned.

BACKGROUND OF THE INVENTION

The present invention relates to a method and system for the automatic orientation and control of a robot. The automatic working of a defined surface by the robot is derived from the automatic orientation. The robot moves on the surface in an optimal manner, that is, the robot traverses trajectories on the surface, which are the shortest distances possible for the complete working of the surface and this is accomplished in the shortest possible time.

The German Patent Publication 2,020,220 discloses a method for the automatic working of a limited surface in which a surface working apparatus travels on the surface and changes its direction of travel at the borders of the surface. To this end the apparatus travels on the surface in accordance with a given working program, whereby it follows a given trajectory sequence, for which obstacle limits and dimensions are ascertained by contact with the obstacles as they occur and respective signals are stored in a memory whereby the surfaces even behind an obstacle become accessible for the working operation, for instance, vacuum-cleaning or lawn mowing. Thus, it is possible with the known apparatus to avoid surface portions which remain unworked, whereby, however, it appears to be questionable whether the precise performance of the working is possible where the obstacles have a complicated shape and where the obstacles are distributed on the surface in a difficult or complex pattern.

Another limitation of the known apparatus is seen in that the fixed and simple working and driving program for each apparatus comprises the introduction of a few fixed changes in the driving direction so that a rational work performance does not appear to be possible.

In its basic approach the apparatus according to German Patent Publication No. 2,020,220 is quite identical to all devices of this type, because the space and obstacle limits are sensed exclusively in a blind manner so to speak. This type of sensing has substantial technical limitations, because, although in theory a fault-free operation is possible, in practice one has to take into account the integration or summation of errors, which cannot be avoided where a blind sensing takes place. The just mentioned prior art apparatus is also quite similar to other prior art devices in that the working of the surface takes place along predetermined trajectories. In the apparatus according to German Patent Publication No. 2,020,220 only one or more fixed driving directions are employed and these directions may be selected to the type of limit contact being actuated. Thus, the freedom of movement and thus the movability or rather the maneuverability is limited to the selection of a few predetermined, controlled driving directions and there is no possibility of a feedback or a return to a trajectory already driven.

There are also systems known wherein the working or driving program is fixed by guide lines or tracks rigidly installed into the surface to be worked or into the surface along which the robot is to travel. Such fixed guide lines or tracks have the disadvantage that they provide but one degree of freedom for the movement of the robot, namely, along the guide line or track.

German Patent Publication No. 2,235,318 published on Feb. 7, 1974 and corresponding to U.S. Pat. No. 3,900,260 granted Aug. 19, 1975 describes an electro-optical measuring apparatus suitable for use in robot systems as disclosed herein.

OBJECTS OF THE INVENTION

In view of the above, it is the aim of the invention to achieve the following objects singly or in combination:

to provide a method and apparatus for performing said method for the control of a robot system, wherein the orientation and driving, as well as the working operations are determined by the robot itself by computing respective trajectory curves by means of which the robot is controlled in such a manner that the robot is operating so to speak on a seeing basis, rather than on a sensing basis;

to achieve an optimal utilization of the two degrees of freedom of travel on a plane or surface, whereby the robot is to travel the shortest possible distance and use up the shortest possible time to complete the working of a surface;

to employ a plurality of different distance measuring methods and to utilize the measured results in accordance with a predetermined order of preference;

to reduce any errors or faults in the working of a surface to a minimum;

to employ a plurality of measuring systems in such a manner that the performance of the respective orders is determined by the smallest distance measured in order to increase the probability that a predetermined function is performed without any faults due to giving the performance priority always to the shortest distance measured;

to provide means for continuously correcting driving errors so that there will always be assured a certain overlap between adjacent trajectories to properly cover the surface to be worked, while simultaneously assuring that said overlap is kept to a minimum in order to avoid wasteful operations; and to directly drive the robot system without the use of power transmitting means, such as gears, sprocket wheels, V-belts and synchronizing means such as a synchro-tie.

SUMMARY OF THE INVENTION

According to the invention there is provided a method for orienting a robot system in all directions by providing the system individually or in combination with optical, acoustical, mechanical and/or electrical devices for ascertaining of direct measurement values of scalar values regarding a surface and/or space during the orientation and/or working procedures. These scalar values are subjected to data processing and storage devices, whereby with the aid of mathematical models and mathematical transformations, characteristic data for a surface and/or the surrounding space are automatically produced by which the surface and/or the surrounding space is sufficiently defined in geometrical terms. An optimizing model is employed to abstract from the data instructions for the robot system for the driving and working, said instructions comprising sequential steps which are performed as the result of control signals supplied to a power amplifying means for actuating the drive means connected thereto.

The just described steps assure on the one hand the optimal utilization of the two degrees of freedom provided by a surface. On the other hand, the present method provides, contrary to the methods known heretofore, a continuous correction of the trajectory by a feedback relative to the trajectory so far traversed by the robot system, said feedback being provided with regard to the space through which the robot system travels or with regard to fixed characteristic space reference points, which may be measured at any time. By these features of the invention, a defined and efficient, more specifically, rationalized movement of the robot system on the surfaces to be worked becomes possible for the first time. This applies especially for large surfaces or surfaces having a complex, difficult shape.

According to the invention, the present method is performed by measuring distances between the robot system and points in a far range, in a close range, and in a contact range, whereby the points may be defined by relatively small surfaces and whereby the several measuring methods are arranged in accordance with a certain order of preference or priority of performance, that is, in a hierarchic manner. The distance measuring in the far range is done by electro-optical means, as, for example, disclosed in the above mentioned U.S. Pat. No. 3,900,260. The distance measurement in the close range is done by electro-optical means and/or electroacoustical means and/or electrical or mechanical means. In the contact range, however, the measurement is accomplished in a binary manner by mechanical and/or electrical means. In any of the just mentioned instances of measuring the distance, such measurements are followed by a data reduction.

By the just described features, namely, a plurality of distance measurements in different ranges followed by a data reduction, the invention assures that the robot system cannot destroy any obstacles in its path, whereby even a direct contact should be avoided. Furthermore, the invention eliminates malfunctions of the robot system in an exact manner in that the robot system always does what it intends to do in accordance with its planning or strategy. The performance of such strategy assures that working faults are reduced to a minimum, namely, to those faults which do not depend on the present method. The performance of the present working and driving strategy by the robot system makes it possible for the system to perform the intended functions in a better manner than would be possible by employing operating personnel, because such personnel could not optimize this complex method.

According to the invention there is further provided an active system redundancy for achieving a reliable operation free of contradictions. This active system redundancy is employed to check the partial and global or total orientation methods. This checking by means of an active system redundancy has the further advantage that the characteristic orientation data may be extracted in a more certain manner. Preferably, the active system redundancy employs a plurality of different systems which are not equal to each other.

According to an important embodiment of the method of the invention, the scalar distance measurement correlates the present or instantaneous robot system position with the characteristic data of the space, whereby such characteristic space data may have to be abstracted. In this manner it is assured that an absolute driving error is always maintained within a narrow tolerance range during the entire working operation. In this way it is further achieved that the summation or integration of driving errors, which is a common drawback of prior art systems, is avoided since the invention reduces the error to an absolute, constant value, which is independent of the measuring range.

According to the invention the non-equal system redundany is achieved in that the results of the electrooptical distance measurements are correlated to the combined relative distance and angular measurements with the aid of relative coordinates. In this manner it is possible to employ the least expensive and most effective systems meeting the above described requirements.

According to the invention the distance measurement results are converted and transformed into coordinates and stored in an orientation memory. In this manner, the mathematical treatment of the present problem is simplified and the size of the required memory is substantially reduced as compared to a method in which the space is stored in the form of a space model requiring a larger memory capacity.

Furthermore, according to the invention, an orientation computer determines and checks the origin of the coordinate system for the orientation data. The orientation computer further correlates the instantaneous position of the robot system relative to the space coordinate system. In doing so, the directly measured coordinates are checked and corrected by means of an orientation strategy or plan. The essential importance of this feature is seen in that out of a plurality of uncertain measured values, a few certain and characteristic values are extracted. In addition to producing the characteristic orientation coordinates, a current coordinate is produced which gives information regarding the instantaneous position of the robot system, as well as regarding the instantaneous status of the work performed. This additional current coordinate is also stored in the orientation memory, whereby, if desired, an orientation coordinate may become a working coordinate. This feature has the advantage of facilitating the locating of surfaces which have not been worked as compared to prior art methods.

According to the invention there is provided a computer which performs the driving strategy and the working strategy on the basis of the orientation data stored in the orientation memory. The computer calculates respective trajectories and trajectory corrections with the aid of additional data. Further, an orientation computer continuously controls the orientation during the driving and working procedures. These features of the invention make it possible that this particular portion of the system does not comprise any intermeshed connections to the data processing means of the system, although a complex cooperation between the data processing means and the computers is assured, whereby any error transmission is minimized. In addition, and contrary to the prior art, the invention continuously corrects any possible driving error, whereby the necessary overlap of the two adjacent working paths is kept to a minimum.

The drive of the robot system according to the invention is accomplished by two or more digitally controllable drive motors without any intermediate power transmission means, such as gears, sprocket wheels, V-belts, and intermediate synchro-ties. Such direct digital control may be accomplished, for example, with reluctance motors and the steering of the robot system is accomplished solely with the aid of these drive motors. This feature has the advantage that elements which are subject to wear and tear are substantially eliminated on the one hand and that on the other hand inaccuracies, which, for example, may be caused by mechanical play are eliminated. In addition, these digitally controlled direct drive means provide for a large mobility. Further, such digitally controllable drive means provide for a very precise and direct control, as is necessary for the present method.

According to the invention it is further suggested that a central robot system is combined with one or more satellite robot systems having the same or a different working function, for example, a vacuum-cleaning may be followed by a waxing and polishing, whereby the satellite robot systems are effective outside the operational range of the central robot system, and whereby the satellite systems are controlled by the central system. For example, the satellite systems may be smaller than the central system whereby surfaces may be worked, which cannot be reached by the central system due to its size or due to the type of movements or degrees of freedom of the central system.

According to the invention there is further provided a robot system for performing the just described method step, comprising:

(a) a first device (E1) including measuring means, data reduction means, and adaptor means; the first device is connected to a computer (E2) which in turn is connected to an orientation memory (E3); an orientation computer (E4) is connected to the first mentioned computer (E2);

(b) a fifth device (E5) also comprising a computer cooperates with the devices recited under a) above in a complex manner, a device (E6) comprising control and data processing means is connected to the computer device (E5); a device (E7) comprising power amplification and further control means is connected to the device (E6);

(c) a device (E8) comprising the drive means as well as corresponding position indicator means is connected to the device (E7) and to the drive (E5) for supplying steering angle data to the device (E5);

(d) an automatic self-checking device (E9) is connected to the enumerated devices (E1 to E8) for the continuous checking of the operational status of these devices; the device (E9) includes an apparatus for the automatic self-charging as well as a unit for an overriding operator remote control of the robot system; and (e) the system further comprises diverse batteries and power supply means known as such as well as operating or working means such as a brush set or vacuum-cleaner means or mower means or polishing means and the like, which may include the respective attachments and adaptor elements.

According to the invention, the robot system is provided on each side or along each of its sides with one or more input-output means of an electro-optical system arranged in one or several planes and in fixed angular positions ($\iota$) relative to a main axis of the robot system. In this manner the invention achieves a universal survey regarding any obstacles and boundaries reached by the system, whereby the basic conditions are provided for ascertaining the space in a coordinate system.

In a preferred embodiment of the robot system the electro-optical distance measuring means comprise lenses defining the respective input and output. The lenses preferably have centers located in the same coordinate position. A shield means is provided for the lenses to eliminate false or unwanted light to reduce measuring errors which might otherwise be caused by slanted light which might reach the lenses without these shields.

Preferably, the inputs and outputs of the electro-optical distance measuring device or system are arranged on a rotating disk, whereby the input-output devices on each disk are angularly spaced from each other by a fixed angle ($\alpha$) and whereby another fixed angle ($\beta$) is maintained between respective input-output devices on an adjacent disk, said disks being arranged coaxially relative to each other. This feature permits a very rapid orientation in space relative to characteristic reference points. Furthermore, the lens system of the electro-optical distance measuring device is variably adjustable to provide for different beam width angles ($\delta$). Thus, the beam width angle is substantially equal to zero for the scalar distance measurement. Stated differently, the scalar distance measurement is accomplished with a sharply focused beam. On the other hand, obstacles in the close or medium range are ascertained by increasing the beam with angle ($\delta$). This feature has the advantage that a sharp image is achieved, which is necessary for the scalar distance measurement and that on the other hand even obstacles having small surfaces are ascertained or recognized. According to the invention it is further suggested to provide the robot system with electro-acoustical measuring transmitters, which are arranged in such a manner that they ascertain the entire respective coordinate field in the close range in one or several planes, whereby collisions are avoided in an emergency. Further, the robot system is provided at its outer areas preferably adjacent to the floor or adjacent to the ground at the four corners with electroacoustical transmitter and receiver means, which may be dimensioned with a system redundancy, if desired. In this manner the robot system is enabled to avoid depressions in the ground or to safely drive through such depressions.

According to the invention the self-checking device continuously controls the operational status of the energy sources to cause, if necessary, depending on the particular status, an automatic recharging of the system's batteries or a replenishing of fuel in respective charging and servicing stations. In this manner the operational capability of the system is continuously checked, the action radius is increased and the need for services is reduced.

BRIEF FIGURE DESCRIPTION:

In order that the invention may be clearly understood, it will now be described, by way of example, with reference to the accompanying drawings, wherein:

FIG. 7 is a schematic illustration of a sectional view through a symmetrically arranged double wheel drive;

FIG. 8 is a sectional view through a single wheel drive, whereby the single wheel is supported at one end thereof;

FIG. 9 illustrates a plan view of a robot system according to the invention showing the electro-optical distance measuring means in a schematic manner;

DETAILED DESCRIPTION OF PREFERRED EXAMPLE EMBODIMENTS

Figure 1:
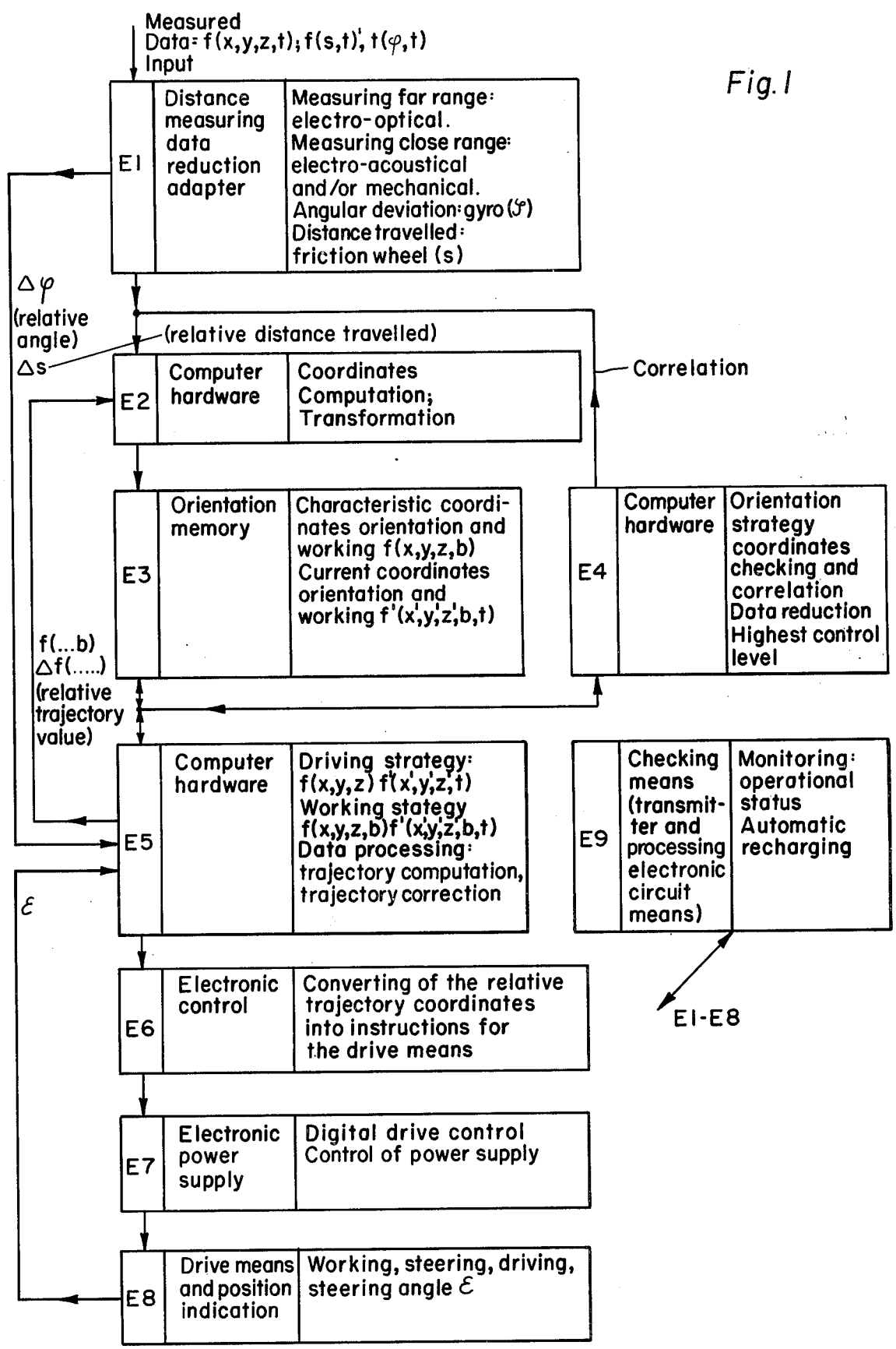
FIG. 1 shows a block diagram of the interconnection and cooperation of the devices E1 to E9 of an example embodiment.

The following detailed description will refer to a ground or floor working machine, preferably performing the functions of brushing and vacuum-cleaning or lawn mowing or similar functions.

Contrary to prior art systems the operations of driving and steering in the system according to the invention are concentrated in a single unit 21 or 22, as illustrated in FIGS. 7 and 8 respectively. In the embodiment of FIG. 7 the unit comprises double wheels 23, 24, whereby each wheel is driven independently and directly, for example, by digitally controlled stepping or sequencing motors. The axle 25 of said double wheels 23, 24 is supported in the housing 26 by a vertical shaft 27, which is freely rotatable when it is not arrested by arresting means 28, such as for example, a magnetic clutch or the like. This type of drive arrangement has the substantial advantage that the automatic driving, as well as the automatic steering are accomplished exclusively by the control of the drive motors 23, 24. A straight, forward drive is accomplished by operating the drive motors 23, 24 synchronously in the same direction, whereby all double wheels 23, 24 extend in parallel to each other.

In order to effect a steering for turning a corner or driving along a curve, the individual wheels of a double wheel are driven with different rpms or even in opposite directions, whereby the double wheels take up a defined angular position ($\epsilon$) relative to the housing of the robot system.

In another embodiment illustrated in FIG. 8 the drive employs individual wheels 29 which are supported at one end thereof by means of a vertical axis 27', which is also rotatably held in the housing and magnetic clutch means 28' are used for arresting the axle 27' in any angular position. The driving and steering is also accomplished exclusively by the control of the drive motors, which constitute the drive wheels. Both embodiments, that shown in FIG. 7, and the embodiment of FIG. 8, assure a maximum maneuverability combined with a utilization of all degrees of freedom in the plane or on the surface on which the robot system operates. A further advantage is seen in that all power transmission means, such as gears and the like are obviated and that the space required for other types of motors may be utilized for different purposes. Besides, the power necessary for the steering is derived from the drive power. The drive motors 23, 24 or 29 are connected to the power supply included in the power device E7. Batteries are used for energy sources as well as fuel cells and air pressure drive means including power supply units and any other conventional power means. The control device or unit E6 converts the relative target coordinates which it receives from the computer E5, to control signals for the electronic power circuit of the unit E7. The computer E5 has performance priority.

Figure 6:
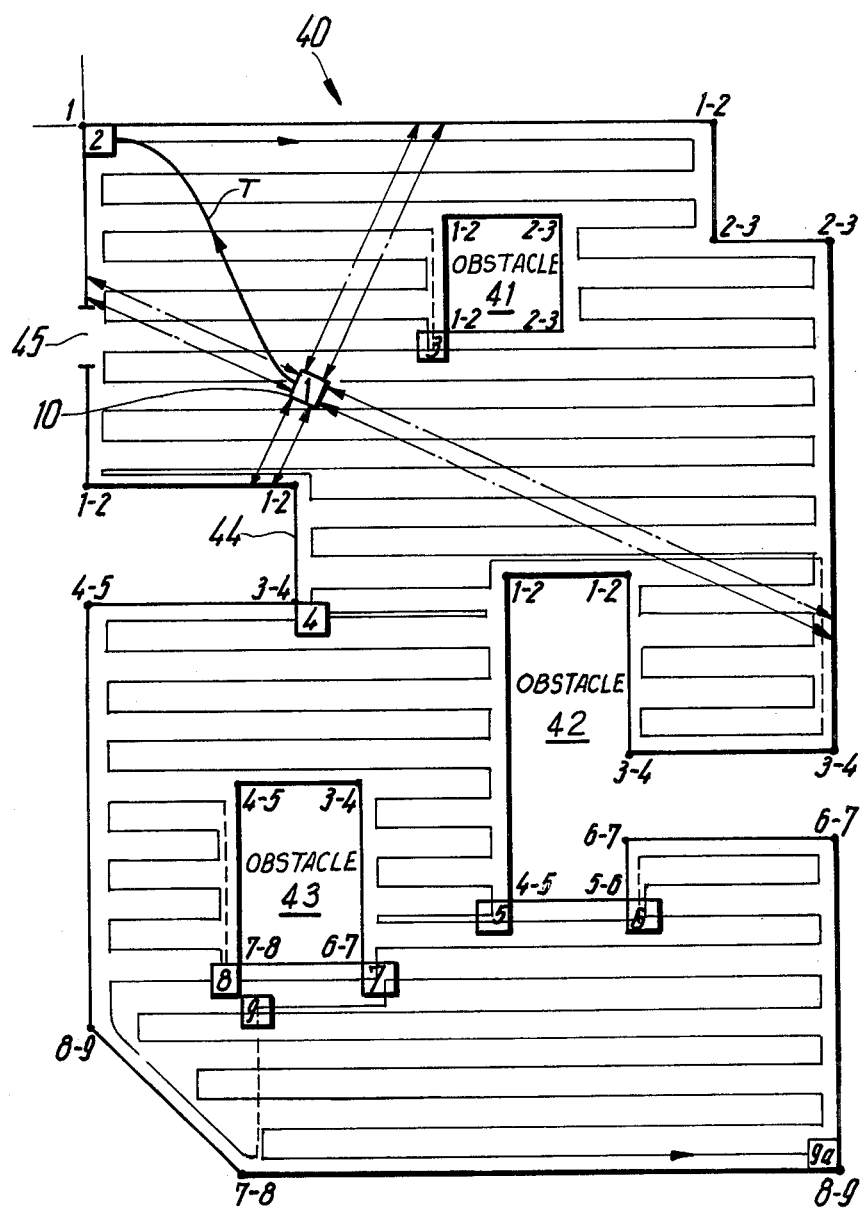
FIG. 6 illustrates an embodiment of a special orientation strategy, a special driving strategy, and a special working strategy.

The computer E5 comprises the driving strategy or plan as well as the working strategy in the form of hardware. FIG. 6 illustrates an example of such a strategy. A room 40 having an irregular shape and including obstacles 41, 42, 43, and 44 is to be worked by the robot system according to the invention, whereby the least possible distances are to be traversed during the smallest possible time, for example, for the purpose of a cleaning operation, whereby no corners or the like must remain uncleaned. To this end it is necessary for the robot system to decide at certain points shown in the form of little squares 1 to 9a in FIG. 6 what specific driving direction is to be followed with regard to the cleaning operation. The following criteria may among others be employed as the basis for determining a driving strategy or plan:

1. Corners: priority: right angle corners have priority over other corners. Further priority that corners where the longest straight lines intersect, which have been ascertained by the robot system. Result: drive from point 1 to point 2 along the trajectory T shown in FIG. 6, whereby the driving direction is toward that straight line which has been determined to be the longest.
2. Surfaces: (2.1) on both sides of the robot system there are surfaces not yet worked or cleaned, please see decision point 3 at 41, decision point 6 at 42, and decision point 8 at 43; (2.2) the surface area to the left of the robot system as viewed in the advance direction is clean or worked, see point 4 at 44; (2.3) the surface to the right of the robot system as viewed in its work advance direction is clean, see point 7 at 43.
3. Overlaps: are to be minimized, see points 4 and 9.
4. Stepped trajectories: see decision point 7 at 43.
5. Trajectories extending with a slant relative to the coordinate axis: (5.1) beginning drive in a parallel fashion (5.2) end of slanted trajectory.
6. Shortest possible distance between the robot system and the surface boundaries: see points 4 and 5 above.
7. Loops in the trajectories: are to be avoided see points 3 and 6 above.
8. Change of advance direction.
9. Decisions to be made on the basis of optimizing models.

The robot system according to the invention traverses the surface while taking into account the fixed and predetermined criteria, for example, a plurality of parallel trajectories may be traversed which are displaced relative to one another in one direction, and which are spaced so as to correspond to one working width of the surface working apparatus, such as a vacuum-cleaner or lawn mower and allowing for a minimum overlap.

Figure 5:
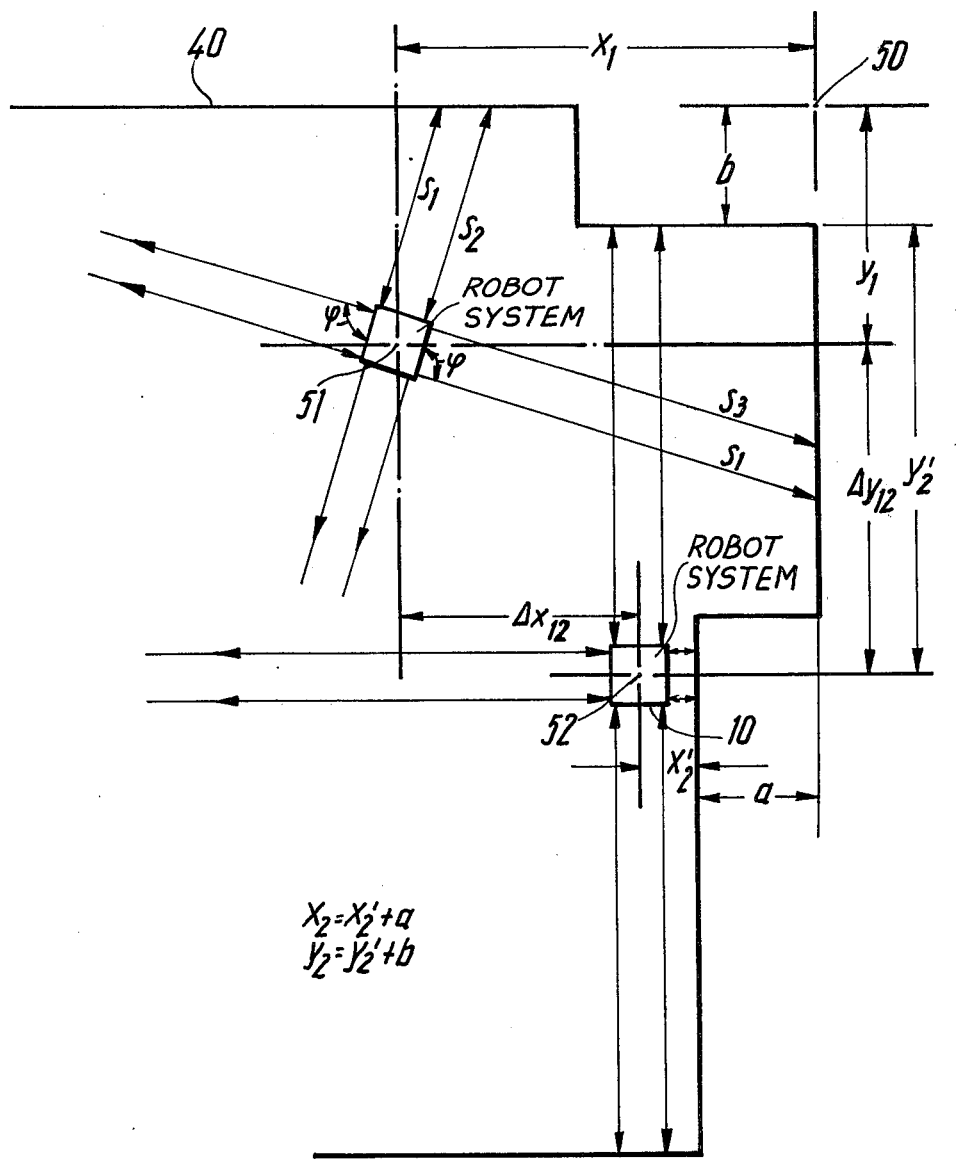
FIG. 5 illustrates in a schematic manner the coordinate computation and transformation.

In order to develop the strategies as outlined above, the computer E5 comprises information data regarding the shape of the surface or space 40 including information regarding the obstacles 41 and 43, which are totally within the surface or space 40. Information regarding the obstacles 42 and 44 is included in the information regarding the shape of the surface or space 40. The computer E5 further receives information regarding the instantaneous working which information is supplied by the orientation memory E3. Contrary to prior art methods, the invention does not store the space or surface shape information in the form of a floor plan model true to scale. Rather, according to the method of the invention, a coordinate origin is fixed by computation which takes into account the coordinates which characterize the space or volume, see for instance FIG. 6, 1. 1—2.-2—2.3—4 and so forth. These coordinates are referenced to a fixed reference point of the space or surface, which is determined and selected by the robot system itself. This approach has the advantage that the required memory capacity is substantially reduced as compared to storing the space in the form of a model illustration. The instantaneous status of the working is, for example, stored in the form of a continuous coordinate, such as $f'(x', y', z', b, t)$ as shown in FIG. 1 in the orientation memory E3 and the computer E5, whereby the characteristic coordinates may be simultaneously flagged for the purpose of indicating the instantaneous working status see, for example, $f(x, y, z, b)$ in FIG. 1 at E3 and E5. The characteristic coordinates $f(x, y, z, b)$ as well as the current or instantaneous coordinates $f'(x', y', z', b, t)$ are the result of a data reduction, checking and correlation of the continuously arriving input information by means of the superimposed hardware computer E4. It is the purpose of this hardware computer E4 to survey the space by means of the necessary and sufficient coordinates $f(x, y, z, b)$ and to continuously check and guarantee the correctness of these coordinates and to assure that there is no contradiction. The computer E4 is able to control the driving strategy of the computer E5 by means of the orientation strategy in computer E4, which has a higher priority. If necessary, the computer E4 must supply a new or a corrected coordinate reference point to the hardware coordinate computer E2. The computer E2 converts on the basis of known mathematical laws and equations, the scalar values arriving from the measuring means into space or surface related coordinates $f(x, y, z, b)$ and $f'(x', y', z', b, t)$ as shown in FIG. 5. These scalar values are referenced to the instantaneous system condition or status, of the system, please see $s_1$ to $s_8$ in FIG. 2. The computer E4 supplies the additional informations regarding the instantaneous working status, see $f(x, y, z, b)$ in FIG. 1 or flagging the respective coordinates $f(x, y, z, b)$ and $f'(x', y', z', b, t)$.

Figure 2:
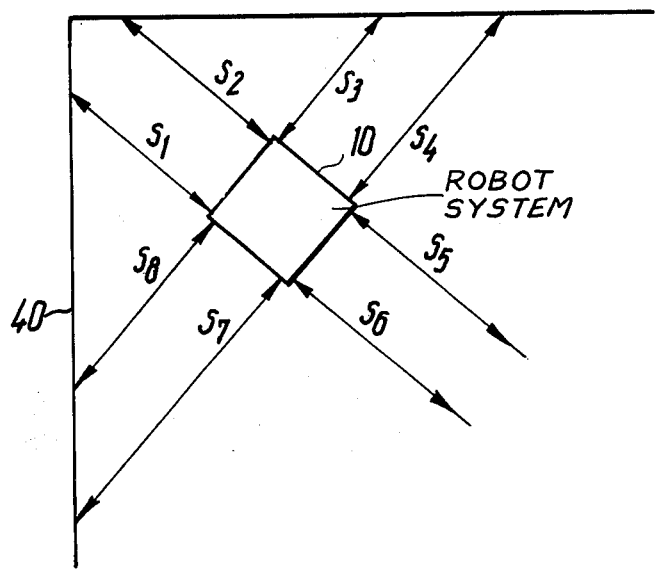
FIG. 2 illustrates the operation of the measuring system in the far range in a schematic manner.

The distance measuring means E1 operates as input means and data supply means for the coordinate computer E2 and is distinguished substantially from corresponding devices used in prior art systems. As mentioned, in the prior art, the space is sensed in a blind manner by sensors of relatively small range. Contrary thereto, according to the invention, the orientation measurements are taken by several, different distance measuring means, which are not equivalent to each other and which have different ranges in a far field, please see FIG. 2, as well as in a close range, please see FIG. 3, and in the contact range, please see FIG. 4 to directly measure the scalar distances $s_1$ to $s_8$, as shown in FIG. 2. The core of the measuring means E1 is an electro-optical distance measuring device as, for example, described in the above mentioned U.S. Patent and shown in present FIGS. 2, 5 and 6. This electrooptical distance measuring device provides also in the far range precise, measured values. The precision of the electro-optical distance measuring means is independent of the distance or trajectory already travelled and also independent of the measuring range. As shown in FIGS. 2, 5, and 6 the distance is measured in that, for example, the robot system 10 is provided on each of its sides with two optical input-output means 11 and 12 as shown in FIG. 9, which, for example, may be arranged for cooperation with one measuring system 13. Each of these eight input-output means measures one scalar distance so that a total of eight scalar distances $s_1$ to $s_8$ are obtained as shown in FIG. 2. These scalar distances have a fixed directional relationship to the robot system due to the structural arrangement of the input-output means 11, 12, please see FIGS. 11 and 12. Four each of these distances $s_1$ to $s_8$ are used for the computation. Thus, the distances $s_1$ to $s_4$ as shown in FIG. 5 are subjected to the computation in accordance with known mathematical laws to provide characteristic surface or space boundaries or corner points, for example, 1.1—2.2—3 and so on as shown in FIG. 6. FIG. 5 further shows the coordinate transformation, which is accomplished by the computer E2. The coordinates $x_1, y_1$, which have been computed from the scalar distances $s_1$ to $s_4$ from the instantaneous position 51 of the robot system 10 constitute abstracted coordinates of the corner 50 in space, which actually is not present, please see FIG. 5. Thus, the corner 50 may be selected as a fictitious coordinate reference point. The position 52 of the robot system shown in FIG. 5 illustrates the computation as a result of the measuring and coordinate transformation with reference to the fictitious reference point 50.

Figure 3:
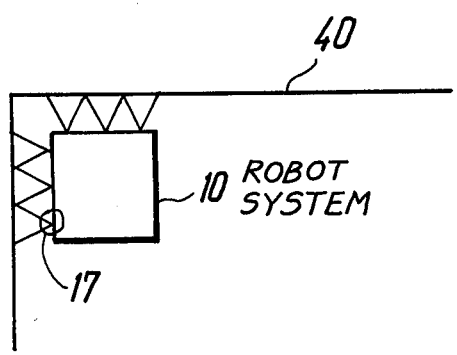
FIG. 3 illustrates the operation of the measuring system in the close range.
Figure 4:
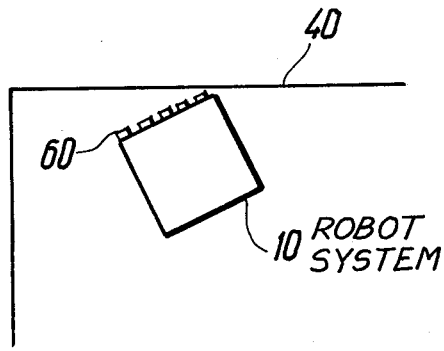
FIG. 4 illustrates the operation of the measuring system in a contact range.
Figure 11:
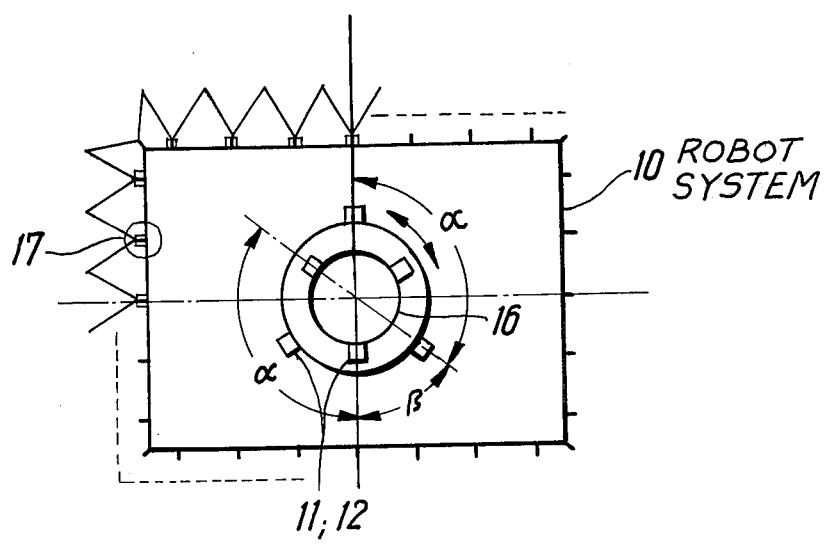
FIG. 11 illustrates in a schematic manner a plan view of a robot system including input-output devices of the electrooptical distance measuring system arranged on rotating disks and further showing electro-acoustical input-output means also in a schematic manner.

The correlation of the measuring results obtained, for example, from the electro-acoustical distance measuring element 17, which are employed in the close range as shown in FIGS. 3 and 11 and the correlation of the electro-mechanical or electrically measured results obtained from the measuring elements 60 in the contact range, please see FIG. 4, is accomplished in the orientation computer 4, whereby a system redundancy is accomplished for securing the orientation coordinates. The device E9 continuously checks and monitors the operational capability and the operational status of the devices E1 to E8 by means of transmitters forming part of these devices E1 to E8 and by means of a data processing electronic circuit arrangement. Especially, the energy sources are continuously checked and monitored and the device E9 is capable of taking respective actions, for example, for the servicing and the automatic recharging of the batteries and the refueling and similar operations. According to a special embodiment of the invention there are provided means by which the robot system 10 will automatically travel to a refueling station where the robot will connect itself to a refueling or recharging outlet.

The gist of the invention is seen in the complex cooperation between the measuring device E1 and the computers E4 and E5, please see FIG. 1. This gist of the invention includes the evaluation of the redundancy of the measuring systems, as well as the capability of the robot system to orient itself in unknown spaces or on unknown surfaces and to develop on the basis of such orientation an optimal working plan and driving plan and to perform such plans. The data connection between the measuring device E1 and the computer E5 in FIG. 1 is, for example, used to supply to the computer E5 which calculates the driving strategy and the working strategy, the relative angle ($\psi$), which is attained, for example, by means of a gyro not shown and the relative distance travelled, which is ascertained, for example, by means of a friction wheel. The connection between the computer E5 and the drive device E8 supplies to the computer E5 the steering angle ($\epsilon$), that is the angular position of the wheels relative to the longitudinal axis 14 of the robot system 10. This steering angle ($\epsilon$) permits the correction of the trajectories. The basic conditions for the computation and correction of the driving plan or of the trajectories are the knowledge regarding the space or surface to be worked. This knowledge is represented by the information which the robot system 10 receives as the result of the cooperation between the measuring means E1, the coordinate computer E2, the computer E4 and the orientation memory E3 on the one hand, and the further cooperation between the computer E4, the memory E3 and the computer E5 on the other hand, which cooperation takes place, for example, during the driving and working of the robot system.

FIG. 6 illustrates how the robot system 10 receives the individual orientation points or rather the characteristic coordinates defining such points. Thus, the robot system is in a position to compute position point 2 immediately after entering into the space 40. The other characteristic coordinates, for example, the indicated corner points are received by the robot system during th driving between the illustrated decision points 1 to 9a. Thus, FIG. 6 shows which characteristic points may be measured and calculated by the robot system 10 as it drives between points 1–2, between points 2–3, 3–4, 5–6, 6–7, 7–8, 8–9, 9–9a. In this manner it is basically also possible to treat a space as a unit and work it as such in spite of passages or openings 45. Due to the continuous computation of new characteristic coordinates, and due to the erasing of previously stored coordinates, which have been passed in the progress of the robot system, it is possible, according to the invention, to also work a very large space, while nevertheless requiring a minimum of storage capacity in the orientation memory.

Figure 10:
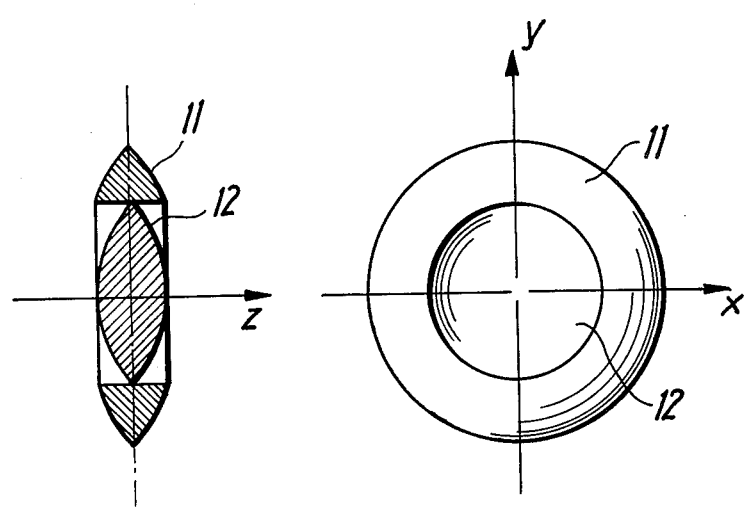
FIG. 10 illustrates the lens arrangement of an electro-optical input-output means.

FIG. 10 illustrates an arrangement of the optical lens system for the input and output means 11, 12, whereby the centers of these lenses have the same coordinates. This is necessary due to the required light shield for screening out undesired light.

Figure 12:
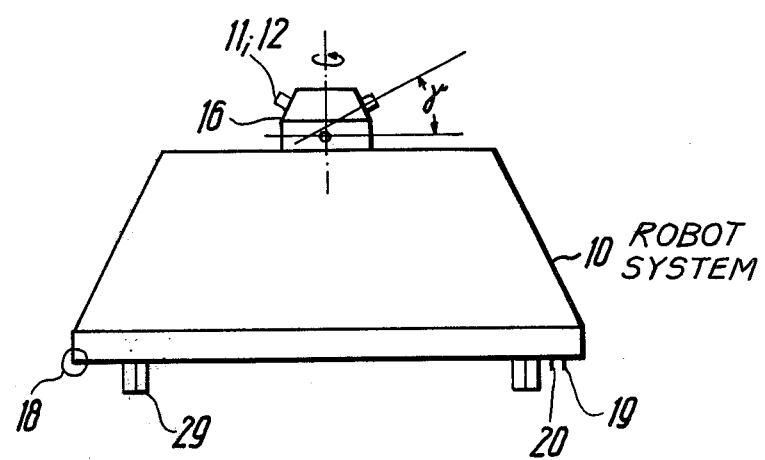
FIG. 12 illustrates the robot system according to the invention in a schematic manner, showing especially the locations or positions of the electro-optical ground transmitters.

FIG. 12 illustrates the arrangement of the electro-acoustical transmitters 19 and receivers 20, which are preferably secured to the system at the outer areas close to the ground or floor and preferably at the four corners adjacent to the floor. These electro-acoustical means 19, 20 protect the robot system 10, for example, against stairsteps or the like. Further, FIG. 12 illustrates the inclination angle ($\gamma$). FIG. 11 illustrates the angles ($\alpha$) and ($\beta$), by which the input and output means 11, 12 are angularly displaced relative to each other in one particular embodiment. This particular angular displacement ($\alpha$), ($\beta$) has the advantage that it enables a universal orientation in space without causing any ambiguities.

Figure 13:
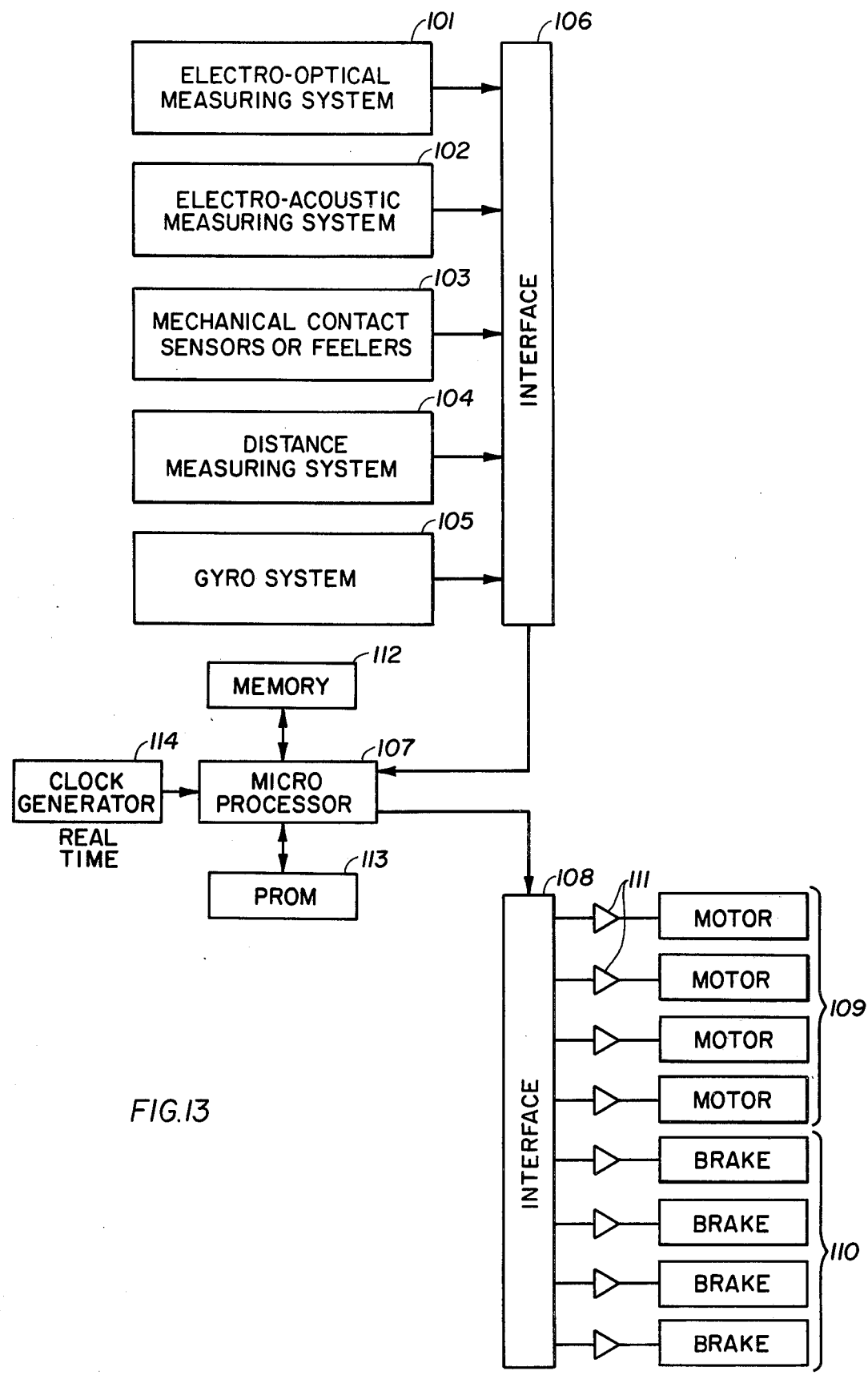
FIG. 13 is a further block diagram of the system of the invention, incorporating a micro-processor.

Referring now to FIG. 13, therein is illustrated a block diagram of a system in accordance with the invention employing a micro-processor. As illustrated in FIG. 13, an electro-optical measuring system 101, for example, of the type disclosed in U.S. Pat. No. 3,900,260, provides digital output signals corresponding to the distances and angles of boundaries, such as walls, from the apparatus. An electro-acoustic measuring system 102, which is comprised of a conventional acoustic sound generator and detector, provides digital output signals also corresponding to the distance between the apparatus and walls, as illustrated in FIG. 3.

If desired, the apparatus may be provided with mechanical contact feelers 103, for example, as disclosed in U.S. Pat. Nos. 3,713,505 and 3,744,586. In the simplest arrangement in accordance with the invention, the sound system 102 and the mechanical sensor 103 are not absolutely necessary, although they are preferably provided as redundant features for emergency situations.

In addition, the apparatus comprises a distance measuring system 104, which may be a friction wheel adapted to engage the surface upon which the apparatus runs. In addition, in order to enable the determinations of angles, a conventional gyro 105 may be provided on the apparatus.

The digital signals from the devices 101 to 105 are applied by way of an interface circuit 106 to a micro-processor. The output from the micro-processor is applied by way of a further interface 108 to a plurality of motors 109 and brakes 110, for example, by way of power amplifiers 111. The motors 109 correspond to the motors illustrated, for example, in FIGS. 7 and 8, and the brakes 110 correspond to the brakes 28 and 28' illustrated in these figures. The micro-processor 107 is connected in conventional fashion to suitable memory circuits 112, for example, RAM'S to a PROM 113, and to a real time clock 114. While a number of micro-processors satisfactory for the micro-processor 107 are currently available, it has been found that an INTEL type 8008 is satisfactory for this device, in combination with Rockwell Type 10738 BUS INTERFACES for the interfaces 106 and 108. Conventional memories and PROMS are employed for the memory 112 and the PROM 113.

In comparison of the system of FIG. 13 with the block diagram of FIG. 1, it is apparent that the devices 101 to 105 correspond generally to the block E1 of FIG. 1. The micro-processor generally includes blocks E2 to E6 of the apparatus of FIG. 1, although it will be apparent that the functions of certain elements of these blocks are effected by the PROM, which is programmed in accordance with the control required for given types of work areas. It will further be apparent that, if the apparatus is to be employed in other types of work areas or in other embodiments, the PROM may be substituted by a further PROM programmed for such other types of areas.

The motors and brakes 109, 110 and amplifiers 111 of FIG. 13 correspond to block E8 of FIG. 1. In its simplest form, in accordance with the method of the present invention, the distances between the apparatus and a boundary or wall are detected, for example, by the electro-optical measuring system, and digital information corresponding to these distances is applied by way of the interface 106 to the micro-processor. Under the control of the PROM, this data is converted into coordinates, and, if necessary, stored in the memory 112. Depending upon the information received and the relationship of the information to previous information, the PROM directs the micro-processor to process the data for the development of output control signals for application to the motors 109 and brakes 110 by way of interface 108. For example, if, in accordance with the program in PROM 113, the apparatus is moving parallel to a given wall, the digital output signals of the electrooptical measuring system 101 will effect the generation of output signals to the motors 109 to keep the input data signals constant. Alternatively, if the apparatus is closely approaching a wall, this will be indicated by the output of the measuring system 101, and under the control of the program in the PROM 113, output signals to the interface 108 will be generated, dictating the stoppage of forward movement of the apparatus, as well as controlling any further movement of the apparatus.

Thus, in accordance with the invention, the apparatus is controlled in response to the conditions of the work space itself, and is dependent upon the apparatus sensing or "seeing" obstacles, corners, or the like, and reacting by changing its motion, if necessary, in response to such sensing, in accordance with the program stored in the apparatus. It is therefore not necessary to provide the apparatus with complete data related to the size and shape of the room and obstacles therein, as was necessary in the past. In addition, in accordance with the invention, the apparatus may be programmed to effect the working of a number of different types of similar areas with great efficiency, and without the necessity of specifically programming the course of the apparatus in the different work areas for efficient operation.

In its best mode the present system operate as follows:

In the first step of the procedure of operation of the apparatus, in accordance with the invention, it is necessary for the apparatus, upon entry into a given work area, to establish the coordinates of an "origin", which will be employed as a reference for further operations. This "origin" is preferably a corner in the work area, although, as illustrated in FIG. 5, the origin may be a fictitious point with respect to the actual work area.

Referring now to FIG. 6, it is assumed that the apparatus has moved into the illustrated work area, by way of the door 45. During the movement of the apparatus to the position "1", the electro-optical measuring apparatus will be generating signals corresponding to the distances of the different walls from the apparatus, the gyroscope will produce signals corresponding to the angular disposition of the apparatus, and the distance measuring device will provide a measurement of the actual distance that the apparatus has moved.

Based upon the receipt of this information, the microprocessor will be able to establish the location of the junction of the walls at the position 2, as corresponding to the intersection of two major walls of the area. This information is adequate to enable the apparatus to commence its operation, and produce control signals for the motors to move the apparatus from the position "1" to the position "2", as illustrated in FIG. 6.

Following such location of the apparatus, the motors are controlled, in response to the instantaneous coordinates of the apparatus with respect to walls and obstacles in the area, to traverse a course throughout the area that covers each individual location in the area, with a minimum of overlap.

In its best mode, the system in accordance with the invention functions, in response to input data, in the following manner, in order to effect the control of the position of the apparatus:

1. Initially upon entry of the apparatus into an area a corner position formed by the intersection of, e.g., the longest wall of the room is determined and stored as a first coordinate origin. The position is determined arithmatically, in response to the receipt of a number of input signals corresponding to distance to the walls, distance travelled, and angle.
2. Upon determination of the coordinates of the origin, the motors of the apparatus are energized to move the apparatus to the origin, or as close to the origin as possible.
3. Upon reaching the origin, the work operation starts, following a program, wherein the apparatus proceeds parallel to a first wall from the origin in the X direction until a second wall is reached, upon which the apparatus is stopped, stepped in the Y direction, one working width of the apparatus, and then proceeds in the opposite direction (−X) parallel to the first wall until another wall is reached. This program of movement continues unless and until modified in accordance with one of the subsequently described conditions, and thence continues following the response to the following conditions. The X and −X directions are herein considered to be opposite directions parallel to one wall of the work area, the Y direction is assumed to be the direction away from that wall, and the −Y direction is assumed to be that direction toward said one wall.
4. Conditions under which the program of FIG. 3 is modified are as follows:
    (A) When, upon any reversal in the X or −X direction, following a Y step, the reversal was affected at only a portion of a wall, the next step in the Y direction will be equal to the portion of the wall which was detected. This is indicated at the reversals following the positions "4" and "5" in FIG. 6, and serves to minimize the duplication of working of the area, while insuring that the apparatus completely works the areas against the various walls.
    (B) When a wall or obstacle is detected in the −Y direction from the apparatus, and the detected distance suddenly steps from 0, motion in the X or −X direction is stopped, and the apparatus steps in the −Y direction to a given Y coordinate corresponding to the X coordinate of the corner. For this purpose, the X, Y coordinates of obstacles are stored when the apparatus closely passes an obstacle or corner in the X, Y direction. This coordinate is erased following the −Y step as above discussed. This condition is seen at the positions "3" and "8" in FIG. 6. If the condition exists where the detected distance in the −Y direction does not correspond to a stored X coordinate, then the apparatus is stepped in the −Y direction until the closest wall is reached. This condition is in response to the condition existing at corner "6" in FIG. 6.
    (C) If a full step in the Y direction is inhibited by a wall, the step will be only partial, up to the wall, and the remainder of the step will be completed when there is no longer an obstruction in the Y-direction. This condition is illustrated in FIG. 6 at the partial wall below and to the left of the position "1".
    (D) If, in a wall blocking the X direction, a corner appears that is spaced from a further corner in the wall by a determined distance, the opening will be ignored and the wall considered to be complete. This condition occurs at the door 45 in the illustration of FIG. 6. The apparatus will have stored therein a distance corresponding to the width of doors of the various areas, and when such a distance is detected, the openings will be ignored, and calculations of the position of walls will be made as though the wall were complete in the region of the door.

(E) If an object occurs in the Y direction that is less than a working distance away from the apparatus, the X, Y coordinates of the trailing corner of the obstacle are stored. If a blind corner is reached before the work is done in the work area, then the apparatus is returned to this X, Y coordinate for continuing the work. This form of instruction enables the apparatus to fully work an alcove, such as that to the right of the obstacle 42 in FIG. 6, while still enabling completion of the working of the entire area. The indication of whether or not the completion of this alcove constitutes completion of the work of the entire area, may be indicated by storing the maximum Y coordinate detected in the working, and comparing it with the Y coordinate upon completion of working of the alcove. In more complex work areas than that illustrated in FIG. 6, it may be necessary to store further information in the apparatus, in order to insure that the apparatus is not stopped before completion of working the entire area. For example, data concerning the complete length of the room may be prestored in the apparatus.

(F) If a slanted wall is detected at the end of a course in the X direction, following a move in the Y direction, the apparatus may be moved to follow the slanted line to its end, and then to step in the −Y direction to the Y coordinate that is one work width from the last Y coordinate before the slanted course was taken. This move in the −Y direction may be effective along the slanted wall itself, or it may be effected directly in the −Y direction, as indicated at the point "9" in FIG. 6.

(G) As an alternative to A above, when the end of an X course is at a partial wall, a decision is made as to whether, in the next course, the distance in the X direction, or the distance in the −X direction will be greater. If the shorter of these requires a reversal of the movement of the apparatus, then the procedure in step A is followed. Otherwise, the step in the Y direction is made as above, but the apparatus is not reversed in the X direction. When the apparatus reaches its next wall, however, it is stepped in the Y direction only the remainder of the full step, and the program then continues. This type of movement is illustrated generally at the point "7" in FIG. 6.

(H) If the apparatus detects a change of elevation of the floor, as would occur at a stairstep, this is interpreted as a wall, to effect a reversal of motion in the X direction of the apparatus.

(I) If the apparatus approaches an obstacle or wall which only impedes its motion on the Y side thereof, the apparatus is stepped in the −Y direction a distance corresponding to the length of the partial wall or obstruction, and then proceeds forward in the same direction. The step in the −Y direction is reversed when the apparatus clears the obstacle.

(J) The movement of the apparatus may terminate when the apparatus is blocked by walls in the X and Y direction, although, as above discussed, under certain conditions the operation may continue if this condition is not indicative of completion of the working of the area. Upon the termination of the working of the area, the apparatus may be provided with an instruction to proceed to another position, such as to another area, for further operation.

Although the invention has been described with reference to specific example embodiments, it is to be understood, that it is intended to cover all modifications and equivalents within the scope of the appended claims.

What is claimed is:

1. A method for automatically orienting and controlling a robot system in a space for performing work on a defined surface in said space as a result of said orientation, said robot system travelling on said surface, comprising measuring scalar values on all sides of the system representing said surface or space, supplying said scalar values to data processing means including mathematical models and performing mathematical transformations to produce characteristic data for said surface or space which characteristic data geometrically define said surface or space, to provide a basis for said orienting, processing said characteristic data with the aid of a mathematical optimization model to form operation instructions for said robot system, said operation instructions comprising a sequence of steps for moving and working, and supplying said operation instructions to said robot system, said scalar values being ascertained predominantly during the orientation and/or working.

2. The method according to claim 1, comprising employing a plurality of different type measuring methods for measuring distance between the robot system and points in a far range, in a close range and in a contact range, and arranging said measuring methods in an order of preference or rank.

3. The method according to claim 2, wherein said points comprise relatively small surfaces.

4. The method according to claim 2, comprising measuring in said far range by electro-optical means, said measuring in said far range being followed by a data reduction.

5. The method according to claim 2, comprising measuring in said close range by any one of the following means: electro-optical means, electro-acoustic means, electrical means, and mechanical means, said measuring in said close range being followed by a data reduction.

6. The method according to claim 2, comprising measuring distance in a binary manner in said contact range by any one of the following means: mechanical means and electrical means, said binary distance measuring in said contact range being followed by a data reduction.

7. The method according to claim 2, comprising assigning an execution priority to the distance measuring means which measure the smallest distance in said close range.

8. The method according to claim 1, providing an active redundancy including different systems, and partially as well as globally (non-local checking) checking results of said orienting by means of said active redundancy whereby reliability is assured and contradictions are eliminated.

9. The method according to claim 1, further comprising producing an error correction value within a narrow tolerance range for the control of the movement of the robot system, by correlating said scalar values representing an instantaneous position of said robot system, with characteristic space data or with abstracted characteristic space data.

10. The method according to claim 1, further comprising taking first measurements by electro-optical means, taking second combined relative distance and relative angle measurements and correlating said first and second measurements by means of relative coordinates, whereby a non-equal system redundancy is achieved.

11. The method according to claim 1, comprising measuring distance values and converting said distance values into coordinate values by means of transformation.

12. The method according to claim 11, comprising computing said coordinate values in accordance with an orientation planning or orientation strategy as characteristic coordinates and storing said characteristic coordinates in an orientation memory.

13. The method according to claim 11, comprising checking and fixing a coordinate origin for said characteristic coordinates in a space coordinate system by means of an orientation computer, said orientation computer also correlating an instantaneous robot system position and said space coordinate system to each other, and wherein said orientation computer examines and corrects the directly measured coordinates by means of said orientation planning or orientation strategy.

14. The method according to claim 12, comprising storing a current coordinate in said orientation memory in addition to said characteristic coordinates, said current coordinate providing information regarding the instantaneous position of the robot system and the working progress, whereby an orientation coordinate may be used as a working or machining coordinate.

15. The method according to claim 12, wherein a computer performs the driving and working planning or strategies by using the data stored in said orientation memory, said computer computing respective trajectories for the robot system by employing additional data, and wherein said computer corrects said trajectories in response to steering information included in said additional data.

16. The method according to claim 1, wherein an orientation computer causes and controls the continuous orientation of the robot system during the moving and working of the robot system.

17. The method according to claim 1, comprising directly driving said robot system by digitally controllable drive means, and digitally controlling said drive means.

18. The method according to claim 17, comprising steering the robot system by means of said drive means.

19. The method according to claim 17, comprising converting relative trajectory coordinates into digital instructions for said drive means and supplying said digital instructions to said drive means, preferably through power amplifier means.

20. The method according to claim 17, comprising employing steering angles ($\epsilon$), which are defined as the angle between a main axis of the robot system and an instantaneous position of a drive axis of the robot system, and a relative angular deviation as well as a relative trajectory for the checking and correction of the trajectory.

21. The method according to claim 1, comprising employing a coordinate computer and an orientation computer and assigning the lowest priority to the coordinate computer and the highest priority to the orientation computer.

22. The method according to claim 1, comprising using in addition to the robot system having a given operational range, satellite robot means having an operational range outside of said given operational range, and controlling said satellite robot means by said robot system.

23. The method according to claim 22, comprising controlling said satellite robot means by central computer means.

24. A robot system including work performing means for working a defined surface comprising:
(a) first means (E1) including distance measuring means, data reduction means and adapter means, second means (E2) including computer means operatively connected to said first means, third means (E3) including memory means, fourth means (E4) including further computer means, said third and fourth means being operatively connected to said second means for cooperation therewith;
(b) fifth means (E5) including additional computer means operatively connected to the first, second, third and fourth means for complex cooperation therewith, sixth means (E6) including control means and data processing means operatively connected to said fifth means, seventh means (E7) including electronic power means and electronic control means operatively connected to said fifth means;
(c) eighth means (E8) including drive means and respective position indicator means operatively connected to said fifth means for supplying angular steering data to said fifth means;
(d) ninth means (E9) operatively connected to the said first through eighth means including self-checking means for continuously checking the operational status of the system, and self-charging means operatively connected to said self-checking means, said ninth means further including means for an operator responsive overriding remote control operation, and
(e) a plurality of battery means and power supply means operatively connected to said work performing means.

25. The system according to claim 24, wherein said robot system has a main axis and wherein said distance measuring means comprise an electro-optical distance measuring device (13) having at least one input-output means (11,12) arranged on each side of the robot system (10), said input-output means (11, 12) being arranged in at least one plane and at a fixed angle relative to a said main axis of the robot system.

26. The system according to claim 25, wherein said input-output means (11, 12) comprises respective lens means each having a lens center, both lens centers having the same coordinates.

27. The system according to claim 26, further comprising a lens system (15) in said electro-optical distance measuring device, light shield means arranged for keeping false light out of said lens system and cleaning means arranged for cleaning said lens system.

28. The system according to claim 25, wherein said input-output means (11, 12) of the electro-optical distance measuring device (13) comprise respective input-output lens means and rotating disk means (16) supporting said input-output lens means, said input-output lens means being arranged on said rotating disk means with a fixed angle ($\alpha,\beta$) relative to each other.

29. The system according to claim 28, wherein said input lens means and said output lens means are arranged with a fixed angle ($\alpha,\beta$) therebetween, said system including means operatively associated with said input lens means and said output lens means for sequentially bringing said lens means into an operative position relative to said one distance measuring device.

30. The system according to claim 25, further comprising a lens system (15) in said electro-optical distance measuring device, means operatively associated with said lens system (15) for variably adjusting said lens system to different beam width or beam aperture angles (δ), whereby a sharp beam focussing is employed for a scalar distance measuring and whereby the beam width (δ) is widened for recognizing obstacles in an intermediate or close distance measuring range.

31. The system according to claim 25, wherein said electro-optical distance measuring device emits a measuring beam having a sharply focussed beam width corresponding to a beam width angle (δ) which is substantially zero, said system further comprising an optical distance measuring means emitting a measuring beam having a widened beam width angle.

32. The system according to claim 25, further comprising electro-acoustical distance measuring means (17) arranged around the system in such a manner that said acoustical distance measuring means cover in one or more planes the respective complete coordinate field in a close range.

33. The system according to claim 25, comprising electro-acoustical transmitter means (19) and electro-acoustical receiver means (20) arranged along the outer areas of said system preferably at its four corners (18) close to the ground, said electro-acoustical means (19, 20) providing a system redundancy, if desired.

34. The system according to claim 25, further comprising partial and autonomous drive means which are employed for driving and steering in accordance with rank or preference considerations.

35. The system according to claim 34, wherein said drive means (21) comprise drive motors (23, 24) which simultaneously constitute drive wheels for said system.

36. The system according to claim 35, wherein each of said drive means (21) comprises two digitally controllable motors, preferably reluctance motors, constituting a double wheel, a rigid drive axis, means supporting said wheel for rotation about said rigid drive axis and further means supporting said wheel for turning about a substantially vertical axis.

37. The system according to claim 35, further comprising means connecting said rigid drive axis to said substantially vertical axis for turning about said substantially vertical axis, and means operatively associated with said substantially vertical axis for arresting the latter in certain positions.

38. The system according to claim 34, wherein said drive means (22) comprise a digitally controllable drive motor (29) and means supporting said drive motor at one end thereof for rotation about a substantially horizontal axis, and for turning about a substantially vertical axis, said system further comprising means operatively connected for arresting said drive motor (29) against said turning.

39. The system according to claim 24, further comprising power checking means as part of said self-checking means for continuously checking the operational status of said battery means and said power supply means, and means responsive to said power checking means for automatically replenishing expended power.

* * * * *